(12) United States Patent
Oppedahl et al.

(10) Patent No.: US 12,727,592 B2
(45) Date of Patent: Sep. 8, 2026

(54) AGRICULTURAL SPRAYER BOOM TRUSS

(71) Applicant: DEERE & COMPANY, Moline, IL (US)

(72) Inventors: Kody E. Oppedahl, West Des Moines, IA (US); Garry E. Baxter, Ankeny, IA (US); Brian D. Love, Ankeny, IA (US)

(73) Assignee: Deere & Company, Moline, IL (US)

( * ) Notice: Subject to any disclaimer, the term of this patent is extended or adjusted under 35 U.S.C. 154(b) by 386 days.

(21) Appl. No.: 18/490,109

(22) Filed: Oct. 19, 2023

(65) Prior Publication Data

US 2024/0130346 A1 Apr. 25, 2024
US 2024/0224974 A9 Jul. 11, 2024

Related U.S. Application Data

(60) Provisional application No. 63/380,795, filed on Oct. 25, 2022.

(51) Int. Cl.
*A01M 7/00* (2006.01)
*F16L 13/02* (2006.01)

(52) U.S. Cl.
CPC ........... *A01M 7/0071* (2013.01); *F16L 13/02* (2013.01)

(58) Field of Classification Search
CPC .. A01M 7/005; A01M 7/0053; A01M 7/0071; A01M 7/0075; A01M 7/0078; F16L 13/02; B05B 1/20; E04C 2003/0486; E04C 2003/0491; E04C 2003/0495; B23K 2101/24
See application file for complete search history.

(56) References Cited

U.S. PATENT DOCUMENTS

| | | | | |
|---|---|---|---|---|
| 2004/0238659 | A1* | 12/2004 | Wubben | A01M 7/0075 239/166 |
| 2008/0264389 | A1* | 10/2008 | Fochtman | F02M 61/168 123/470 |
| 2012/0273590 | A1* | 11/2012 | Honermann | B32B 37/18 29/890.1 |
| 2012/0273626 | A1* | 11/2012 | Bouten | A01M 7/0071 248/70 |
| 2013/0062432 | A1* | 3/2013 | Barker | B60P 3/2215 239/159 |
| 2016/0309696 | A1* | 10/2016 | Pilney | A01M 7/0057 |
| 2016/0374328 | A1* | 12/2016 | Beggs | A01M 7/0053 239/161 |
| 2017/0000103 | A1* | 1/2017 | Wissler | A01M 7/0075 |
| 2017/0086449 | A1* | 3/2017 | Hiddema | B21C 23/142 |
| 2019/0281807 | A1* | 9/2019 | Gautron | B05B 1/20 |
| 2020/0085031 | A1* | 3/2020 | Lasne | A01M 7/0082 |
| 2022/0217965 | A1* | 7/2022 | Soliman | A01M 7/006 |

* cited by examiner

*Primary Examiner* — Darren W Gorman

(57) ABSTRACT

A truss structure of a spray boom assembly includes a top member, a bottom member, and a first truss member positioned between the top member and the bottom member. The truss structure also includes a first connecting member welded to the top member and the first truss member, and a second connecting plate welded to the bottom member and the first truss member.

20 Claims, 8 Drawing Sheets

416
420
428
412
402
422
410
415
406
400
426
414

AGRICULTURAL SPRAYER BOOM TRUSS

CROSS-REFERENCE TO RELATED APPLICATIONS

This application claims the benefit of U.S. Provisional Application No. 63/380,795, filed Oct. 25, 2022. The entire disclosure of the application referenced above is incorporated by reference.

FIELD

The present disclosure relates to agricultural work vehicle spray system, and in particular, truss panels for an agricultural work vehicle spray system.

BACKGROUND

Spray implements are utilized in conjunction with agricultural work vehicles to distribute flowable materials, such as spray solutions, over crop fields. Larger spray implements, such as those found onboard self-propelled sprayers, may have relatively expansive wingspans approaching or exceeding 30 meters in certain instances. Such spray implements typically feature foldable designs, which enable the spray implement to transition between a deployed, field-ready position and a more compact, stowed position for transportation. By common design, a folding spray implement includes two boom assemblies, which project laterally from opposing sides of a center frame assembly attached to the chassis of the work vehicle. To enable folding of the spray implement, hinge assemblies are provided at the interfaces between the center frame assembly and the laterally-extending boom assemblies. Additional hinge assemblies may also be provided along the respective lengths of boom assemblies and specifically at locations between different segments or wings of each boom assembly. An actuation system is provided to facilitate the folding and unfolding of segments at the hinge assemblies between the stowed and deployed positions.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A truss structure for a spray boom assembly includes a top member, a bottom member, and a first truss member positioned between the top member and the bottom member. The truss structure also includes a first connecting member welded to the top member and the first truss member, and a second connecting plate welded to the bottom member and the first truss member.

In other features, the truss structure includes a second truss member positioned between the top member and the bottom member. The second connecting plate is welded to second truss member.

In other features, the second connecting member is welded to the bottom member by a laser welded lap joint. In further features, the laser-welded lap joint is an endless weld joint.

In other features, a first portion of laser-welded lap joint is parallel to a first edge of the bottom member and a second portion of the laser-welded lap joint is parallel to a second edge of the bottom member. In further features, the laser-welded lap joint includes a filler material.

In other features, the second connecting plate is welded to the bottom member with a weld joint that is inset from an outer edge of the second connecting plate. In further features, the weld joint includes a filler material.

In yet other features, at least one of the first connecting plate and the second connecting plate is a flat metal plate.

A boom segment for a spray boom assembly configured to carry a spray system of a work vehicle includes a first truss panel and a second truss panel. The first truss panel and the second truss panel each include a top member, a bottom member, and a plurality of truss members positioned between the top member and the bottom member. The truss panels also include a first connecting member welded to the top member and a first crossmember of the plurality of the truss members, and a second connecting plate welded to the bottom member and the first crossmember.

In other features, the second connecting plate is welded to the bottom member by a laser-welded lap joint. In further features, the laser-welded lap joint is a continuous weld joint.

In other features, a first portion of laser-welded lap joint is parallel to a first edge of the bottom member and a second portion of the laser-welded lap joint is parallel to a second edge of the bottom member. In further features, the laser-welded lap joint includes filler material.

In other features, the second connecting plate is welded to the bottom member with a weld joint that is inset from an outer end of the second connecting plate. In further features, the weld joint includes a filler material.

In other features, at least one of the first connecting plate and the second connecting plate is a flat metal plate.

In other features, the boom segment includes a lower plate connecting the first truss panel and the second truss panel.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
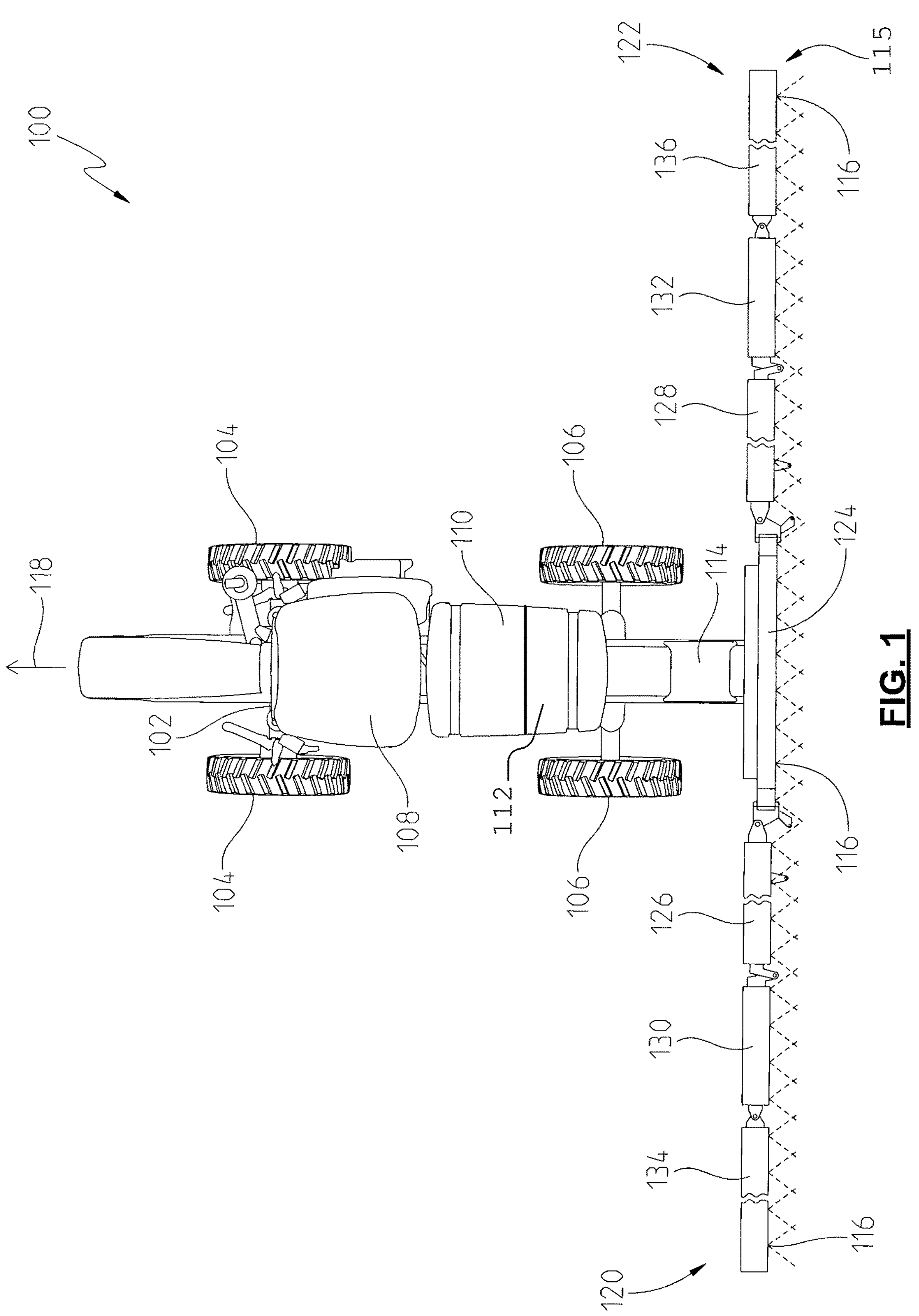
FIG. 1 is a top view of a sprayer system attached to a work machine.

FIG. 1 illustrates an example vehicle carrying a spray boom with spray nozzles mounted on the boom. The vehicle may be a platform or dolly for industrial spray applications or a tractor towing ground-engaging tillage left/right wings with disks and shanks, or a planter towing a row of seed dispenser modules. In FIG. 1 the vehicle is a towed sprayer or a self-propelled agricultural sprayer 100 including a vehicle main frame 102 and an attached autonomous control station or an operator cab 108 for controlling the sprayer 100. The main frame 102 may be supported by a plurality of ground-engaging mechanisms. In FIG. 1, a pair of front wheels 104 and a pair of rear wheels 106 support the main frame and may propel the vehicle in at least a forward travel direction 118. A first tank 110 and a second tank 112 may be mounted to the frame 102 or another frame (not shown) which is attached to the main frame 102. The first tank 110 and the second tank 112 may contain a spray liquid or other substance to be discharged during a spraying operation. In some implementations, the first tank 110 and the second tank 112 are two separate tanks. In other implementations, the first tank 110 and the second tank 112 may different portions—e.g., sealed compartments—of a single tank. Although only two tanks are shown in FIG. 1, the self-propelled agricultural sprayer 100 may include more than two tanks—for example, three for four tanks.

A fixed or floating center frame 114 is coupled to a front or a rear of the main frame 102. In FIG. 1, the center frame 114 is shown coupled to the rear of the main frame 102. The center frame 114 may support an articulated folding spray boom assembly 115 that is shown in FIG. 1 in a fully extended working position for spraying a field. In other implementations, the spray boom assembly 115 may be mounted in front of the agricultural sprayer 100.

A plurality of spray nozzles 116 can be mounted along a plurality of fluid distribution pipes or spray pipes (not shown) that are mounted to the spray boom assembly 115. The plurality of distribution pipes includes a first distribution pipe and a second distribution pipe. Each distribution pipe may be fluidly coupled to the first tank 110 and/or the second tank 112. Each nozzle 116 can have multiple spray outlets, each of which conducts fluid to a same-type or different-type of spray tip. The nozzles 116 on the spray boom assembly 115 can be divided into boom frames or wing structures such as 124, 126, 128, 130, 132, 134, and 136 (or collectively "spray section(s)"). In FIG. 1, the plurality of groups or sections may include a center boom frame 124 which may be coupled to the center frame 114. Although not shown in FIG. 1, a lift actuator may be coupled to the center frame 114 at one end and to the center boom frame 124 at the opposite end for lifting or lowering the center boom frame 124.

The spray boom assembly 115 may be further divided into a first or left boom 120 and a second or right boom 122. In FIG. 1, the first boom 120 is shown on a left side of the spray boom assembly 115, and the second boom 122 is depicted on the right side thereof. In some implementations, a left-most portion of the center boom frame 124 may form part of the first boom 120 and a right-most portion may form part of the second boom 122. The first boom 120 may include those boom frames which are disposed on a left-hand side of the spray boom assembly 115 including a first inner boom frame 126 (or commonly referred to as a "left inner wing"), a first outer boom frame 130 (or commonly referred to as a "left outer wing"), and a first breakaway frame 134. Similarly, the second boom 122 may include those boom frames which are disposed on a right-hand side of the spray boom assembly 115 including a second inner boom frame 128 (or commonly referred to as a "right inner wing"), a second outer boom frame 132 (or commonly referred to as a "right outer wing"), and a second breakaway frame 136. Although seven boom frames are shown, there may any number of boom frames that form the spray boom assembly 115.

As shown in FIG. 1, the first boom frame 126 may be pivotally coupled to the center boom frame 124 via various mechanical couplings. Other means for coupling the first boom frame 126 to the center boom frame 124 may be used. Similarly, the first outer boom frame 130 may be coupled to the first inner boom frame 126, and the first breakaway frame 134 may be coupled to the first outer boom frame 130. In some cases, these connections may be rigid connections, whereas in other embodiments the frames may be pivotably coupled to one another. Moreover, the second inner boom frame 128 may be coupled to the center boom frame 124, and the second outer boom frame 132 may be coupled to the second inner boom frame 128. Likewise, the second breakaway frame 136 may be coupled to the second outer boom frame 136. These couplings may be pivotal connections or rigid connections depending upon the type of boom.

In a conventional spray boom assembly, a tilt actuator may be provided for tilting each boom with respect to the center frame. In FIG. 1, for example, a first tilt actuator may be coupled at one end to the center frame 114 or the center boom frame 124, and at an opposite end to the first boom 120. During operation, the first boom 120 may be pivoted with respect to the center frame 114 or center boom frame 124 such that the first breakaway frame 134 may reach the highest point of the first boom 120. This may be useful if the sprayer 100 is moving in the travel direction 118 and an object is in the path of the first boom 120 such that the tilt actuator (not shown) may be actuated to raise the first boom 120 to avoid contacting the object. The same may be true of the second boom 122. Here, a second tilt actuator (not shown) may be actuated to pivot the second boom 122 with respect to the center frame 114 or the center boom frame 124.

As detailed further below, the first inner boom frame 126, the first outer boom frame 130, the first breakaway frame 134, the second inner boom frame 128, the second outer boom frame 132, and the second breakaway frame 136, referred below collectively as boom segments and individually as a boom segment, are generally formed by one or more metal truss structures. Each truss structure incudes a plurality of tubes or channels—i.e., truss members—welded to connecting members—e.g., plates.

Figure 2:
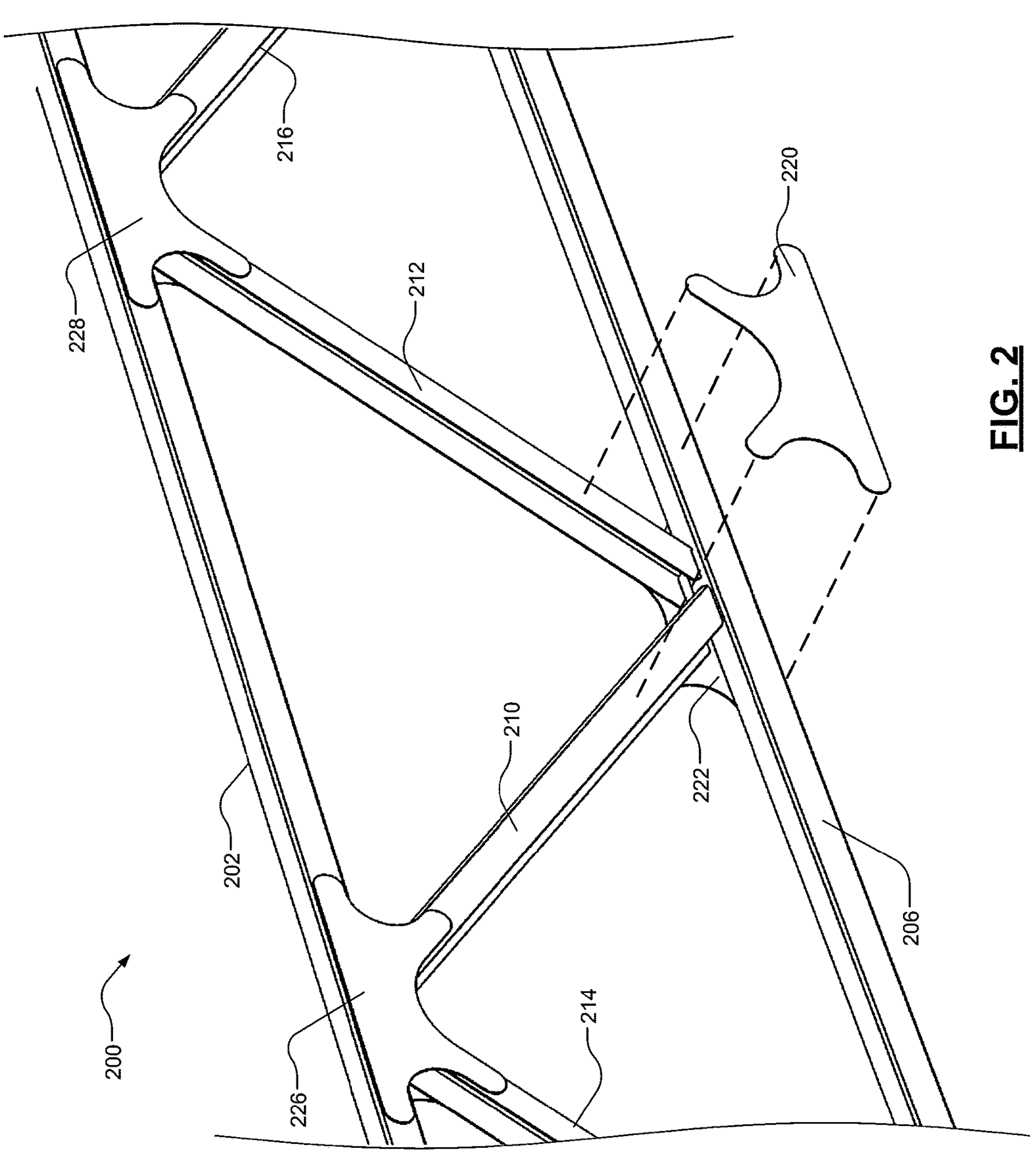
FIG. 2 is a partial isometric side view of an example truss structure according to the principles of the present disclosure.

FIG. 2 is a partial isometric view of an example truss structure 200 used in a boom segment. The truss structure 200 includes a top member 202 and a bottom member 206. A plurality of crossmembers including a first crossmember 210, a second crossmember 212, a third crossmember 214, and a fourth crossmember 216 are located between the top member 202 and the bottom member 204. The truss structure 200 includes a first front connecting member 220 and a first back connecting member 222 that join the first crossmember 210 and the second crossmember 212 to the bottom member 206. The truss structure 200 also includes a second connecting member 226 and a third connecting member 228 that join the first crossmember 210, the second crossmember 212, the third crossmember 214, and the fourth crossmember 216 to the top member 202.

In some implementations, the first connecting member 220, the second connecting member 226, and the third connecting member 228 are flat metal plates—for example, carbon steel, high-strength low allow (HSLA) steel, stainless steel, titanium, or aluminum. In other implementations, one or more of the connecting plates include curved or bent portions.

In some implementations, the top member 202, the bottom member 206, and the plurality of crossmember are made of the same stock—e.g. metal tubes or channels. In other implementations, the top member 202, the bottom member 206, and the plurality of crossmember are made of the different stock—e.g., a mix of metal tubes and metal channels.

Figure 3:
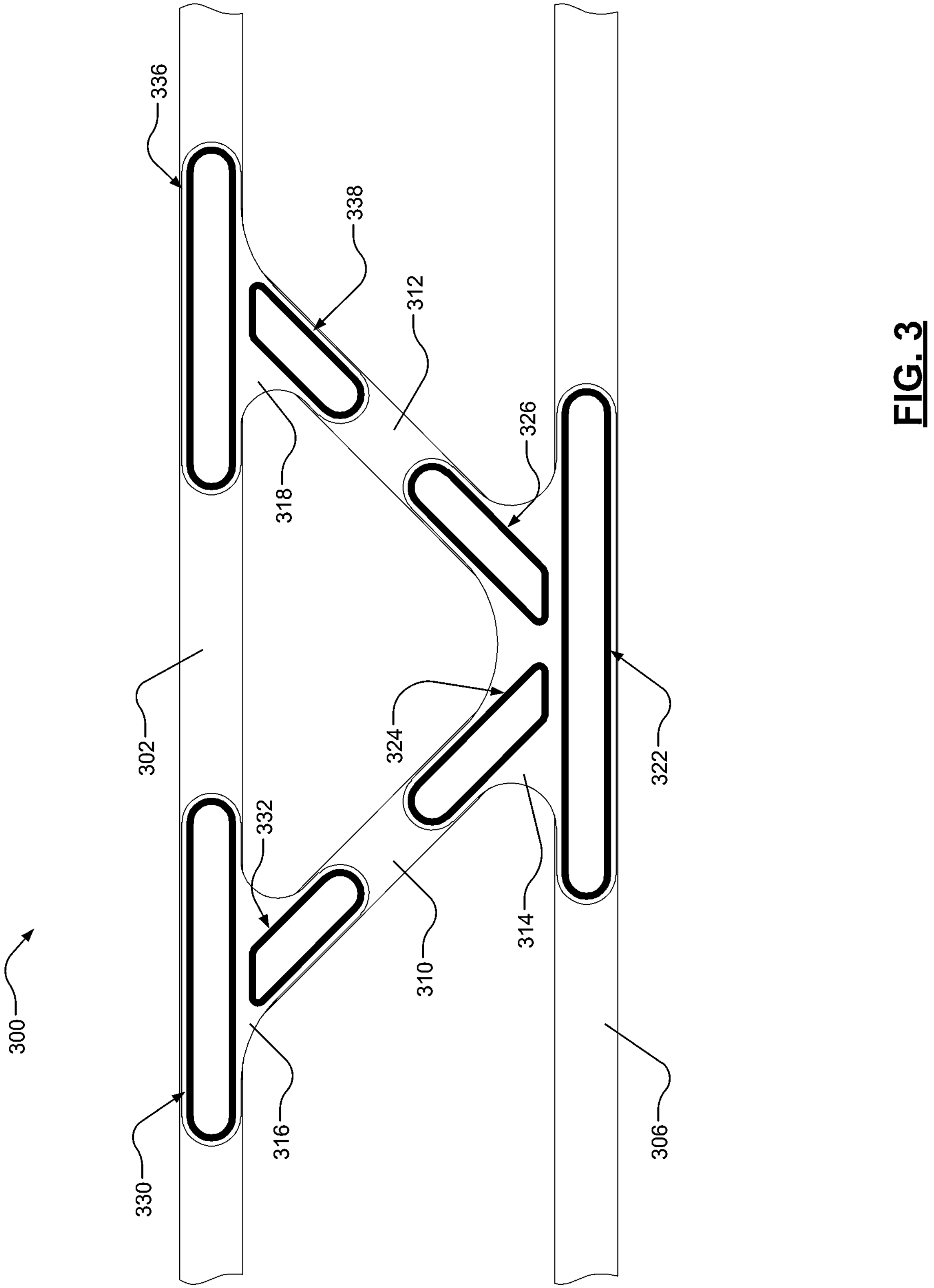
FIG. 3 is a detailed view of an example truss structure according to the principles of the present disclosure.

FIG. 3 shows a detailed view of an example truss section 300. The truss section 300 incudes a top member 302, a bottom member 306, a first crossmember 310, and a second crossmember 312. The truss section 300 also includes a first connecting plate 314, a second connecting plate 316, and a third connecting plate 318. The first connecting plate 314 joins the first crossmember 310 and the second crossmember 312 to the bottom member 306 with a plurality of welded lap joints. The first connecting plate 314 is joined to the bottom member via a first weld joint 322, the first crossmember 310 via a second weld joint 324, and the second crossmember 312 via a third weld joint 326. Similarly, the first crossmember 310 and the second crossmember 312 are joined to the top member 302 by the second connecting plate 316 via weld joints 330 and 332 and the third connecting plate 318 via weld joints 336 and 338.

In some implementations, weld joints 322, 324, 326, 330, 332, 336, and 338 are formed via laser welding. For example, a laser beam is used to penetrate through the connecting plate and into either the bottom member, the first crossmember 310, or the second crossmember 312 to create a weldment. The laser beam provides a concentrated heat source, allowing for both (i) narrow, deep welds and (ii) high welding rates. The use of a laser beam results in melting at an extremely localized point and reduces the total amount of heat applied to the connecting plate and truss member, thus limiting distortion or deformation. In other implementations, resistance welding, friction stir welding, or electron-beam (e-beam) welding are used to create weld joints 322, 324, 326, 330, 332, 336, and 338.

In various implementations, filler material is used when forming the weld joint—i.e., added to the weld pool during the welding process. In other implementations, filler is not added to the weld joint during formation; rather, the material of the connecting plate and truss member form the weld joint.

As shown in FIG. 3, the weld joints 322, 324, 326, 330, 332, 336, and 338 are continuous weld joints. In some implementations, one uninterrupted welding operation is used to from each weld joint. In other implementations, the weld joints are created by two or more welding operations that result in a continuous weld joint. In addition, each weld joint is located within the overlapping portions of the connecting plate and truss member to be joined. For example, the first weld joint 322 connects the first connecting plate 314 to the bottom member 306. The first weld joint 322 lies fully both within the area defined by the outer edge of the first connecting plate 314 and within the area between the upper and lower edges of the bottom member 306.

In various implementations, portions of the weld joints 322, 324, 326, 330, 332, 336, and 338 follow the edges of the respective truss members and/or the contours of the outer edge of the connecting plates. For example, a first portion of the first weld joint 322 is parallel to a lower edge of the bottom member 306 and a second portion of the first weld joint 322 is parallel to an upper edge of the bottom member 306. The first portion of the first weld 322 is also parallel to a lower edge of the first connecting plate 314. A third and fourth portion of first laser weld 322 follow rounded contours of the first connecting plate 314 that overlap the bottom member 306.

In some implementations, as shown in FIG. 3, the weld joints 322, 324, 326, 330, 332, 336, and 338 are inset from the outer edges of the respective connecting plates. In other words, the weld joints 322, 324, 326, 330, 332, 336, and 338 are not edge welded with respect to the various connecting plates. For example, although portions of the first weld joint 322 follow contours of the edge of the first connecting plate 314, they are inset from the edge of the first connecting plate 314. In other implementations, one or more of the weld joints 322, 324, 326, 330, 332, 336, and 338 are a combination of inset and edge welds (not shown).

Figure 4:
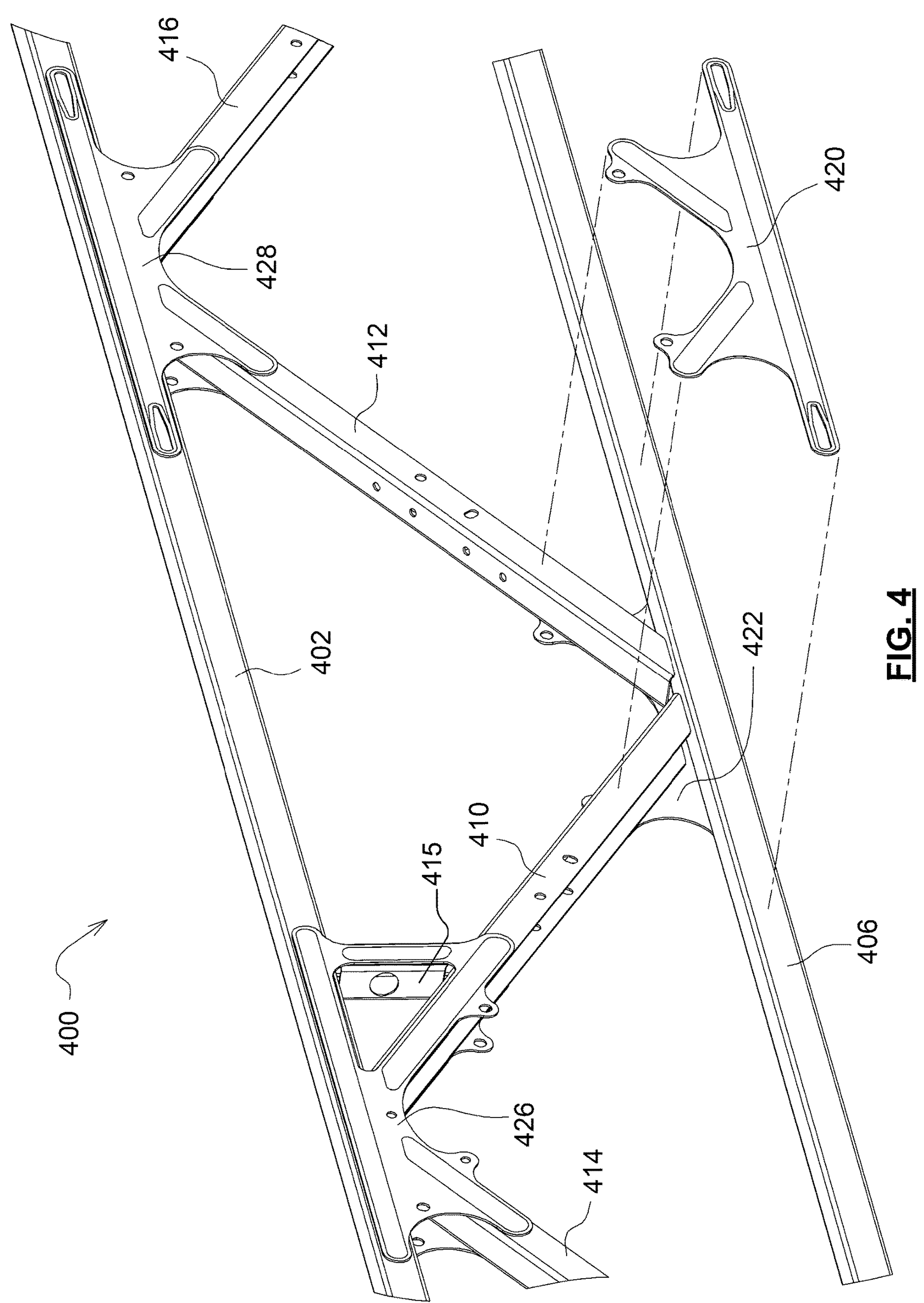
FIG. 4 is partial isometric side view of yet another example truss structure according to the principles of the present disclosure.
Figure 5:
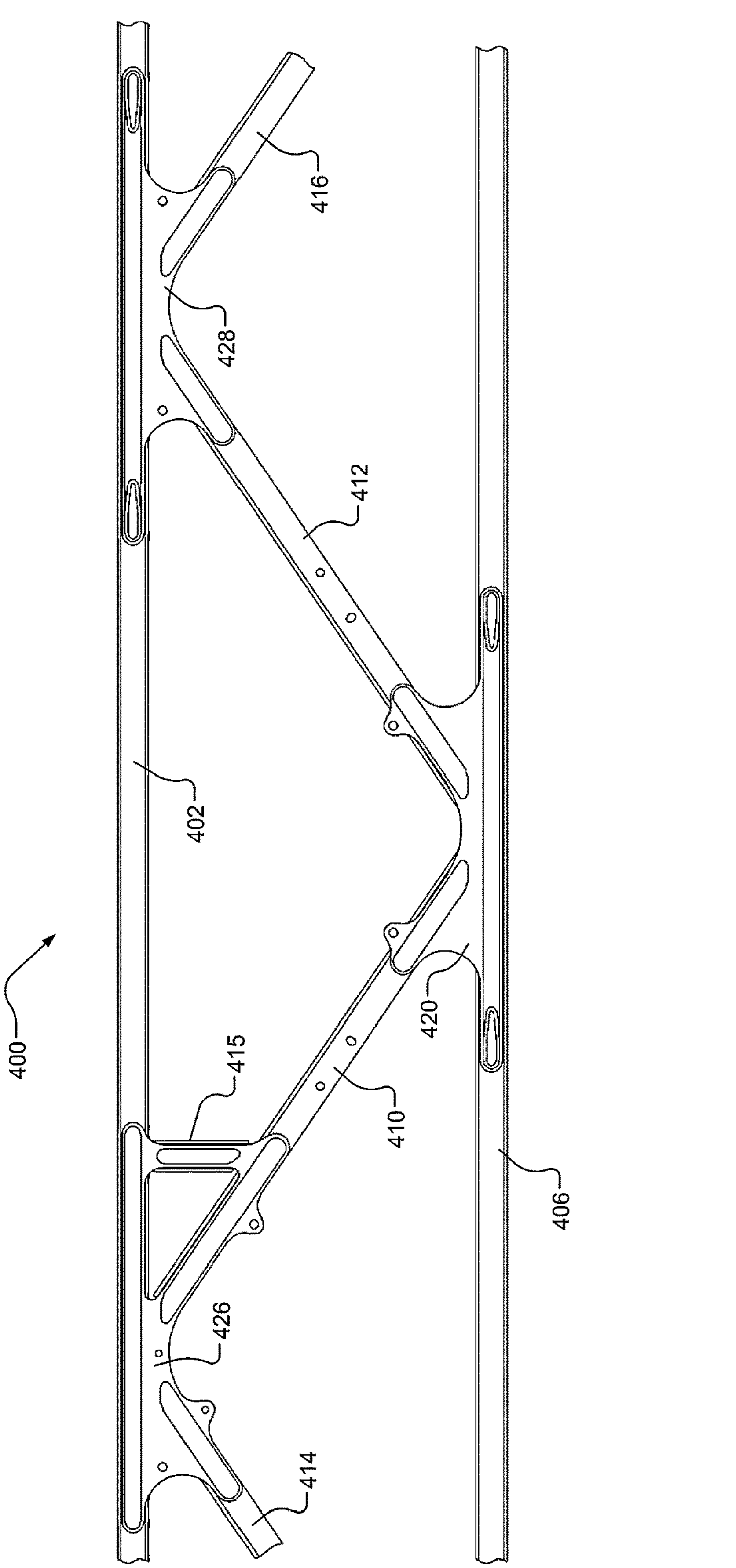
FIG. 5 is a side view of the example truss structure of FIG. 4.

Referring to FIGS. 4 and 5, a truss structure 400 includes a top member 402 and a bottom member 406. A plurality of crossmembers including a first crossmember 410, a second crossmember 412, a third crossmember 414, and a fourth crossmember 416 are located between the top member 402 and the bottom member 404. The truss structure 400 includes a first front connecting member 420 and a first back connecting member 422 that join the first crossmember 410 and the second crossmember 412 to the bottom member 406. The truss structure 400 also includes a second connecting member 426 and a third connecting member 428 that join the first crossmember 410, the second crossmember 412, the third crossmember 414, the fourth crossmember 416, and a vertical member 415 to the top member 402.

In some implementations, the first front connecting member 420, the second connecting member 426, and the third connecting member 428 are flat metal plates—for example, carbon steel, high-strength low allow (HSLA) steel, stainless steel, titanium, or aluminum. In other implementations, one or more of the connecting plates include curved or bent portions.

In some implementations, the top member 402, the bottom member 406, and the plurality of crossmember are made of the same stock—e.g. metal tubes or channels. In other implementations, the top member 402, the bottom member 406, and the plurality of crossmember are made of the different stock—e.g., a mix of metal tubes and metal channels.

FIGS. 6A-6D are partial detailed views of the right half of different connector plates 620*a*-620*d*—for example, the first front connector plate 420—of the structure 400. Each connector plate 620*a*-620*d* is attached to the second crossmember 412 by a continuous weld joint 626 and to the bottom member 406 by a respective continuous weld joint 632*a*-632*d*. In some implementations, the connector plates 620*a*-620*d* are symmetrical about vertical axis 690. In other implementations, the right and left sides of the connector plates 620*a*-620*d* may have different shapes—i.e., the connector plates 620*a*-620*d* are not symmetrical about the vertical axis 690.

Figures 6A, 6B:
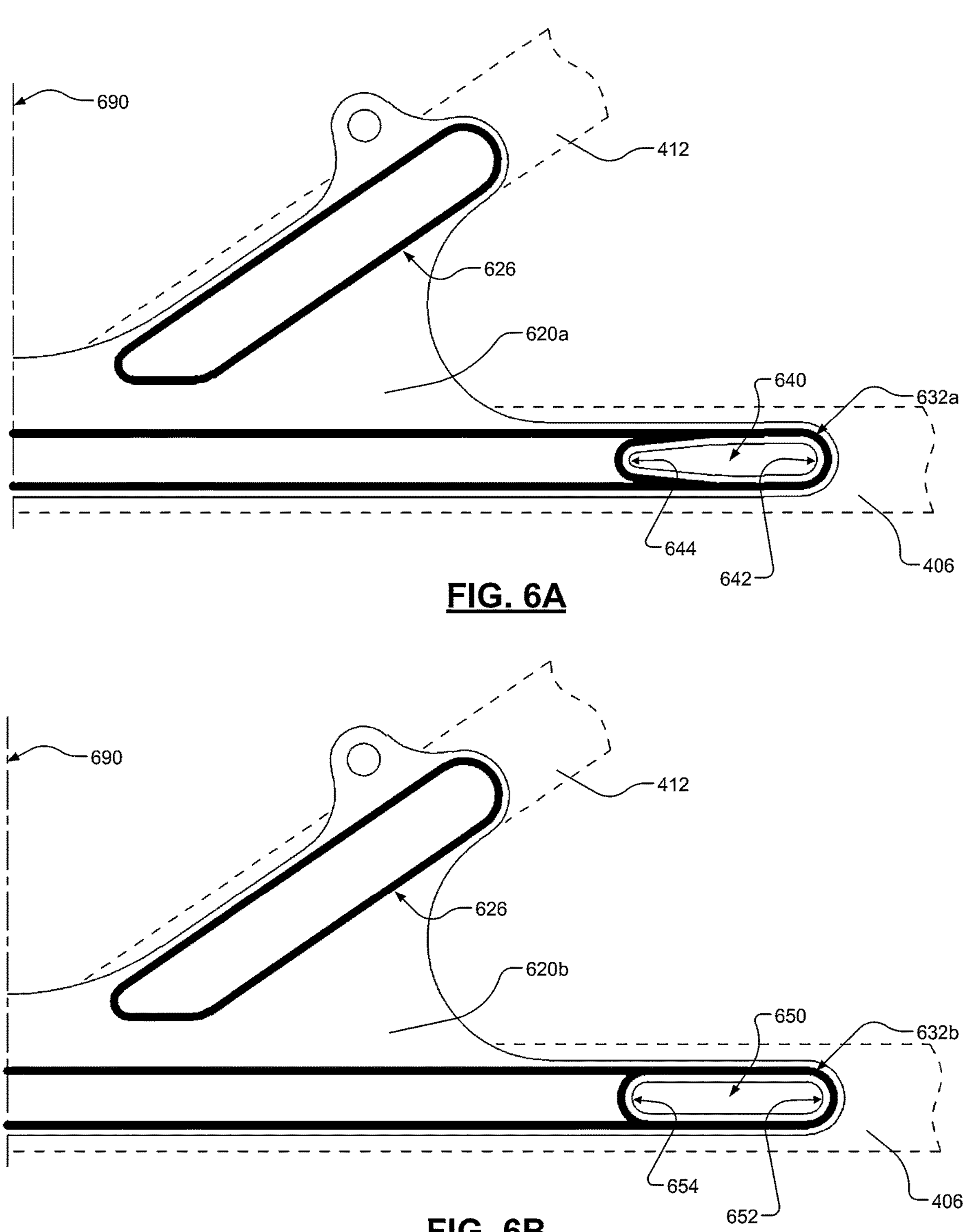
FIGS. 6A-6D are partial detailed views of different connecting plates according to the principles of the present disclosure.

Connector plate 620*a* includes an opening 640 with a rounded end 642 and a tapered end 644. As shown in FIG. 6A, the continuous weld joint 632*a* includes a portion that flows the contours of the opening 640, including the rounded end 642 and the tapered end 644. The opening 640 and associated continuous weld joint 632*a* create a reduced stress concentration when a force, perpendicular to both the bottom member 406 and the vertical axis 690, is applied to the bottom member 406, in comparison to a similar forced applied to the bottom member 306 of the structure 300 of FIG. 3.

Figures 6C, 6D:
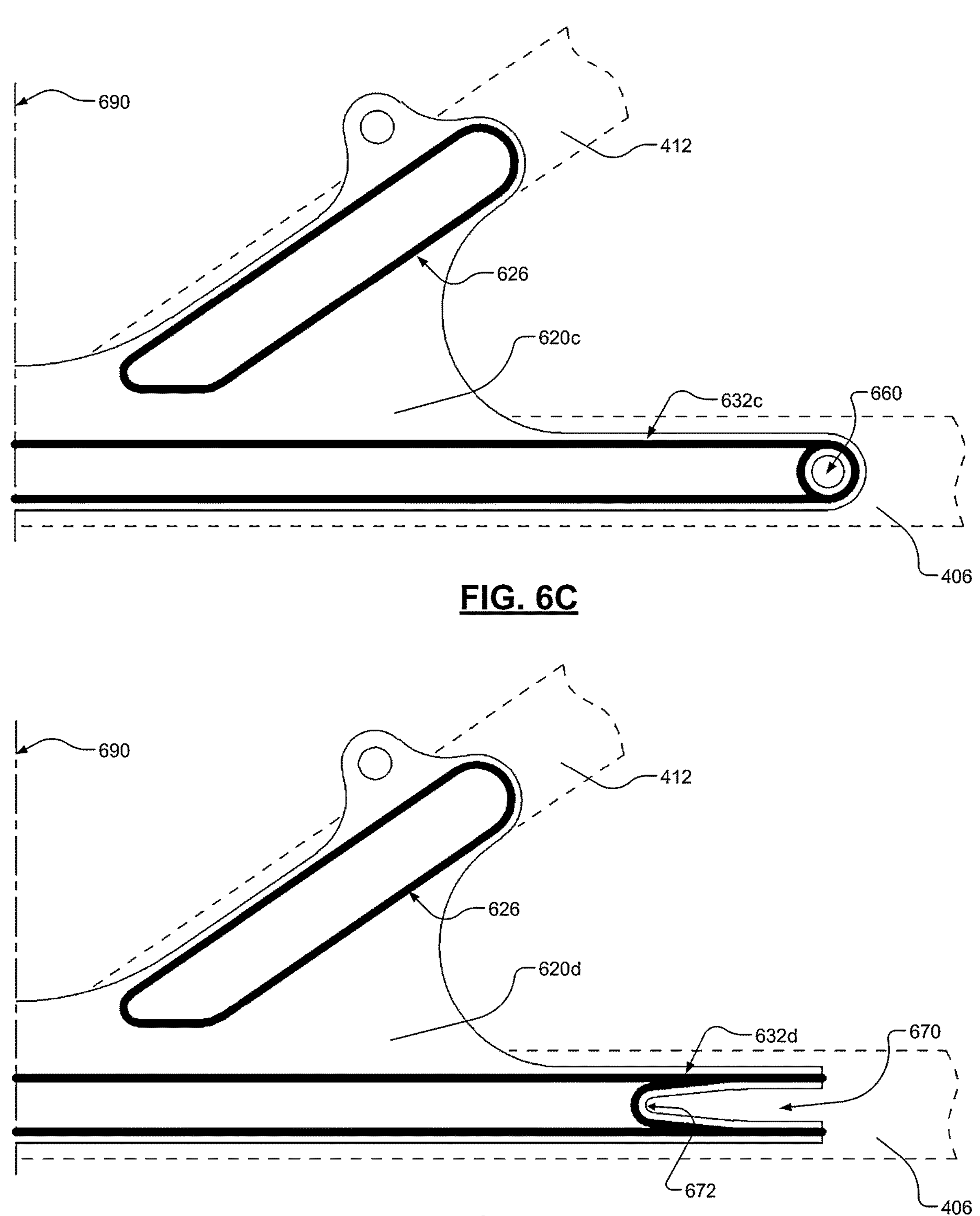

The connector plate 620*b* includes an oblong opening 650 a first rounded end 652 and a second rounded end 654. As shown in FIG. 6B, the continuous weld joint 632*b* includes a portion that flows the contours of the oblong opening 650, including the first rounded end 652 and the second rounded end 654. The connector plate 620*c* includes a circular opening 660. As shown in FIG. 6C, the continuous weld joint 632*c* includes a portion that flows the contours of the circular opening 660. The connector plate 620*d* includes a notched opening 670 with a tapered end 672. As shown in FIG. 6D, the continuous weld joint 632*d* includes a portion that flows the contours of the notched opening 670, including the tapered end 672. The oblong opening 650, the circular opening 660, and the notched opening 670 in conjunction with the associated continuous weld 632*b*,632*c*, 632*d*, also create a reduced stress concentration when a force, perpendicular to both the bottom member 406 and the vertical axis 690, is applied to the bottom member 406, in comparison to a similar forced applied to the bottom member 306 of the structure 300 of FIG. 3.

In some implementations, in place of or in addition to the various openings 640,650,660,670, the thickness of the end of the connecting plate 620*a*-620*d* decreases as the plate end extends along the bottom member 406. The decrease in plate thickness reduces the stress concentration of an applied force to the bottom member 406.

Figure 7:
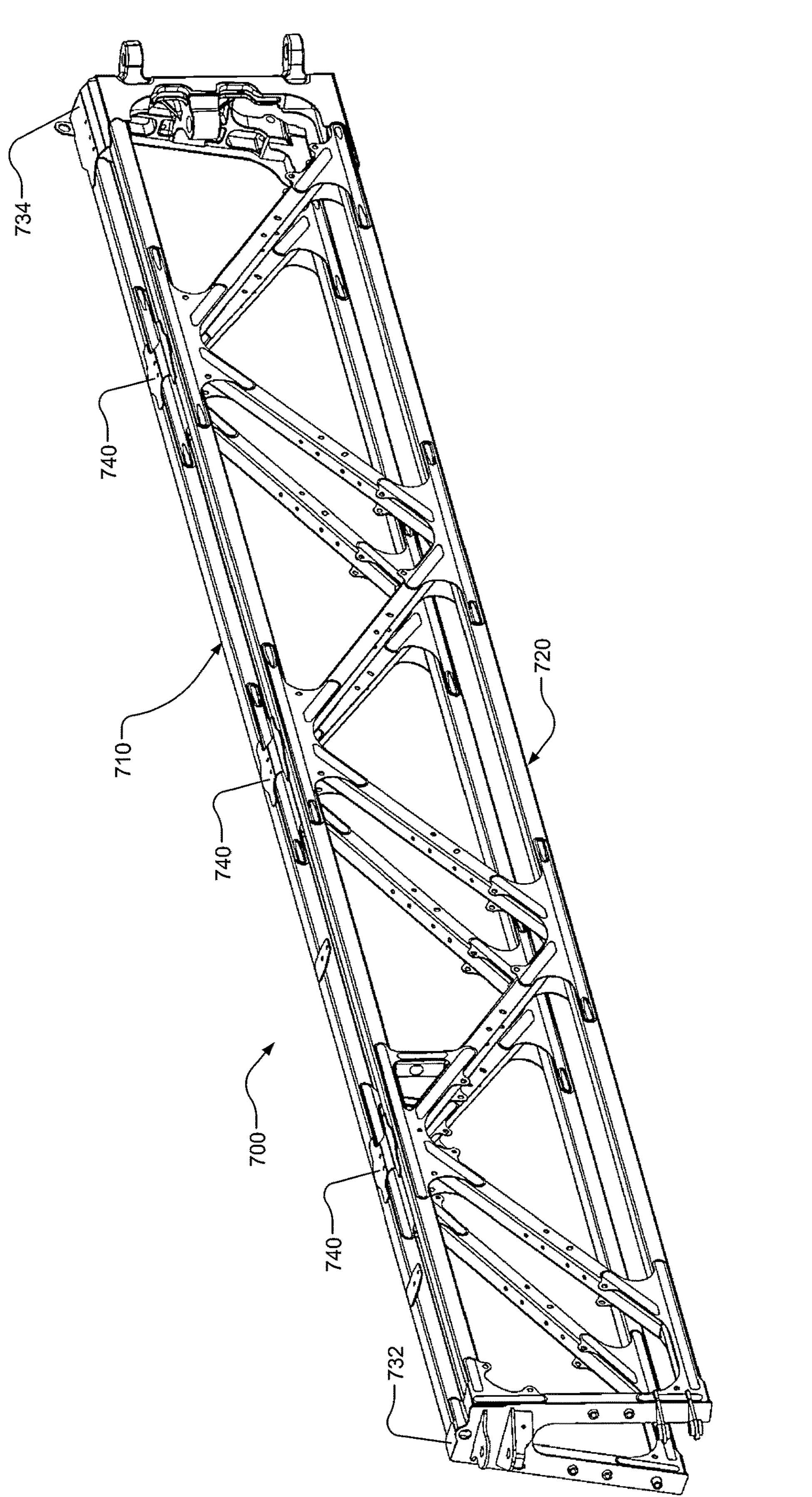
FIG. 7 is an isometric side view of an example boom section that includes truss structures according to the principles of the present disclosure.

FIG. 7 illustrates an example boom segment 700—for example, an outer boom frame. The boom segment 700 includes a first truss panel 710 and second truss panel 720. As shown in FIG. 7, the first truss panel 710 and the second truss panel 720 are both the structure 400 shown in FIGS. 4 and 5 and described above. In other implementations, the first truss panel 710 and the second truss panel 720 may be the structure 200, the structure 300, or another structure that includes truss members and connecting plates, as disclosed above.

The first truss panel 710 is connected to the second truss panel 720 by a first end bracket 732 and a second end bracket 734. The first end bracket 732 and the second end bracket 734 are each configured to be pivotally connected to another boom frame or wing structure—for example, the boom center frame 124, the first or second inner boom frame 126,128, the first or second outer boom frame 130,132, or the first or second breakaway frame 134,136. The first truss panel 710 and the second truss panel 720 may also be connected by one or more top plates 740.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

As used herein, the phrase at least one of A, B, and C should be construed to mean a logical (A OR B OR C), using a non-exclusive logical OR, and should not be construed to mean "at least one of A, at least one of B, and at least one of C." The term subset does not necessarily require a proper subset. In other words, a first subset of a first set may be coextensive with (equal to) the first set.

What is claimed is:

1. A truss structure for a spray boom assembly comprising:
- a top member;
- a bottom member;
- a first truss member positioned between the top member and the bottom member;
- a first connecting member welded to the top member and the first truss member; and
- a second connecting member welded to the bottom member and the first truss member,
- wherein at least one of the first connecting member and the second connecting member is a flat metal plate.

2. The truss structure of claim 1, wherein the second connecting member is welded to the bottom member by a laser-welded lap joint.

3. The truss structure of claim 2, wherein the laser-welded lap joint is an endless weld joint.

4. The truss structure of claim 3, wherein a first portion of the laser-welded lap joint is parallel to a first edge of the bottom member and a second portion of the laser-welded lap joint is parallel to a second edge of the bottom member.

5. The truss structure of claim 2, wherein the laser-welded lap joint includes a filler material.

6. The truss structure of claim 1, wherein the second connecting member is welded to the bottom member with a weld joint that is inset from an outer edge of the second connecting member.

7. The truss structure of claim 6, wherein the weld joint includes a filler material.

8. The truss structure of claim 1, wherein the second connecting member incudes at least one opening.

9. The truss structure of claim 8, wherein the at least one opening in the second connecting member includes a rounded end and a tapered end.

10. A boom segment for a spray boom assembly configured to carry a spray system of a work vehicle, the boom segment comprising:
- a first truss panel; and
- a second truss panel,
- wherein the first truss panel and the second truss panel each include:
  - a top member,
  - a bottom member, a plurality of truss members positioned between the top member and the bottom member, a first connecting plate welded to the top member and a first crossmember of the plurality of the truss members, and a second connecting plate welded to the bottom member and the first crossmember.

11. The boom segment of claim 10, wherein the second connecting plate is welded to the bottom member by a laser-welded lap joint.

12. The boom segment of claim 11, wherein the laser-welded lap joint is a continuous weld joint.

13. The boom segment of claim 11, wherein a first portion of the laser-welded lap joint is parallel to a first edge of the bottom member and a second portion of the laser-welded lap joint is parallel to a second edge of the bottom member.

14. The boom segment of claim 11, wherein the laser-welded lap joint includes filler material.

15. The boom segment of claim 10, wherein the second connecting plate is welded to the bottom member with a weld joint that is inset from an outer end of the second connecting plate.

16. The boom segment of claim 15, wherein the weld joint includes a filler material.

17. The boom segment of claim 10, wherein at least one of the first connecting plate and the second connecting plate is a flat metal plate.

18. The boom segment of claim 17, wherein the second connecting plate incudes at least one opening with a rounded end and a tapered end.

19. The boom segment of claim 10, further comprising at least one plate connecting the first truss panel and the second truss panel.

20. The truss structure of claim 1, wherein the second connecting member is welded to the bottom member by an endless welded lap joint.

* * * * *